(12) United States Patent
Nishio et al.

(10) Patent No.: US 6,590,614 B1
(45) Date of Patent: Jul. 8, 2003

(54) ELECTRONIC CAMERA

(75) Inventors: Tetsuya Nishio, Kawasaki (JP); Tatsuo Konno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/232,909

(22) Filed: Jan. 15, 1999

(51) Int. Cl.$^7$ ............................................. H04N 5/225
(52) U.S. Cl. ...................................... 348/374; 348/373
(58) Field of Search ................................ 348/374, 375, 348/373, 376, 231.7; D16/208, 213; H04N 5/225

(56) References Cited

U.S. PATENT DOCUMENTS

| | | | | |
|---|---|---|---|---|
| 5,627,587 A | * | 5/1997 | Murata | 348/233 |
| 5,657,081 A | * | 8/1997 | Kurahashi | 348/233 |
| 5,764,800 A | * | 6/1998 | Yamagata | 348/231 |

FOREIGN PATENT DOCUMENTS

| | | | | |
|---|---|---|---|---|
| JP | 410117301 A8 | * | 5/1998 | H04N/5/225 |
| JP | 10178570 | * | 6/1998 | H04N/5/225 |
| JP | 2001-8075 | * | 12/2001 | H04N/5/225 |

* cited by examiner

*Primary Examiner*—Wendy R. Garber
*Assistant Examiner*—Catherine Toppin
(74) *Attorney, Agent, or Firm*—Robin, Blecker & Daley

(57) ABSTRACT

The invention provides an electronic camera which is excellent in portability and capable of sensing an image in portrait angle by holding a lower portion of the camera as well as of providing users with a drivability and an operational feeling equivalent to those of a silver halide film camera. The electronic camera comprises: image sensing means for photo-electrically transforming a subject image which is sensed through an optical system; a memory cartridge 4 for recording image data which is produced from the image sensing means as an image picture; and a battery 3 for supplying electric powers to built-in electronic components and various circuits, wherein: the battery 3 and the memory cartridge 4 are disposed, respective width directions being aligned in a depth direction of a main body 1 of the camera while respective thickness directions being aligned in a height direction of the main body of the camera. Further, the battery 3 and the memory cartridge 4 are stored in a vertical adjacency to each other near a bottom portion of the main body 1 of the camera.

5 Claims, 9 Drawing Sheets

ELECTRONIC CAMERA

BACKGROUND OF THE INVENTION

1. Field of the Invention

The present invention relates to an electronic camera and, more particularly, to that which employs a memory cartridge as a recording medium.

2. Brief Description of the Related Art

In recent years, electronic still cameras which focus a subject image through an image sensing lens onto an image sensing device such as a charge coupled device (referred to as "CCD") etc. as a still picture and thereby transform it photo-electrically into image data to be further converted into a digital signal which is storable in the recording media have rapidly prevailed in the market. Those sorts of electronic still cameras employ either a memory cartridge (a semiconductor memory or a magnetic disc which is encapsulated in a flat plastic case) or a memory card as the recording media, a singularity of which can store from several to some tens sheets of the sensed images. The sensed images stored in the recording media are characterized by that photo-retouches are easily available if the image data are transferred to a personal computer either by loading the memory cartridge, which has been unloaded from the camera, or by connecting the cartridge through an exclusive connecting cable to the personal computer. Accordingly, beside an advantage that monitoring the image is easily capable on a display device such as a cathode ray tube (referred to as "CRT"), those configurations have another advantage that it is unnecessary to ask an external shop for photo-printings which silver halide films would require.

FIGS. 8 and 9 are schematic block diagrams showing a first example of conventional electronic still cameras. In FIGS. 8 and 9, a numerical sign 101 stands for a main body of the conventional electronic still camera which has an appearance resembling a single lens-type reflex camera utilizing the silver halide films except for the body height. An image sensing lens 102 for sensing the images is installed on a front wall of the main body 101 of the camera while an eyepiece window 101a of a finder is equipped on an upper portion of a rear wall of the main body. Numerical signs 103 and 104 stand for a battery and a memory cartridge, respectively, both of which are built-in in the main body 101, while their installation and disconnection are carried out through an insertion entrance 105 formed on a sidewall of the main body 101. The memory cartridge 104 installed at a standing status in a lower space inside the main body 101 is replaceable by loading and unloading through the insertion entrance 105. On the other hand, the battery 103 is disposed vertically in a vicinity of the memory cartridge 104 in the lower space inside the main body 101. In the figures, an alphabetic character h stands for a height of the main body 101 and d stands for a depth of the main body 101.

FIGS. 10 and 11 are schematic block diagrams showing a second example of the conventional electronic still cameras. In FIGS. 10 and 11, 111 stands for a main body of the camera, 111a stands for an eyepiece window of a finder which is equipped on an upper portion of a rear wall of the main body 111, 112 stands for an image sensing lens, 113 stands for a battery and 114 stands for a memory cartridge. The memory cartridge 114 is loaded through an insertion entrance 115 and vertically disposed inside the main body 111, being adjacent to the rear wall. Meanwhile the battery 113 is vertically disposed in a vicinity of one of sidewalls of the main body 111.

The electronic still camera shown as the first conventional example in FIGS. 8 and 9 has a tall constitution as the main body. On the contrary, the electronic still camera shown as the second conventional example in FIGS. 10 and 11 has a low outside look with a thick depth as the main body, which is quite different from an ordinary constitution of the silver salt film cameras.

FIGS. 12 and 13 are schematic block diagrams showing a third example of the conventional electronic still cameras. In FIGS. 12 and 13, 121 stands for a main body of the camera, 122 stands for an image sensing lens, 123 stands for a battery and 124 stands for a memory cartridge. The memory cartridge 124 is inserted through an insertion entrance 121a, which is provided on a sidewall of the main body 121, to be disposed horizontally in a lower space inside the main body 121. Meanwhile the battery 123 is disposed below the memory cartridge 124 and the longitudinal direction of the battery is aligned in a depth direction of the main body 121. A numeric sign 121b stands for an eyepiece window of a finder opened on an upper portion of a rear wall of the main body.

The constitution shown as the third conventional example in FIGS. 12 and 13 can be lowered in height compared with the constitution shown as the first conventional example in FIGS. 8 and 9 while can be thinned in depth compared with the constitution shown as the second conventional example in FIGS. 10 and 11.

However, the conventional examples mentioned above have problems as follows:

(A) In the case of the first conventional example shown in FIGS. 8 and 9, both the battery 103 and the memory cartridge 104 are disposed vertically on the lower portion inside the main body 101 so that the height h of the main body 101 grows tall though the depth d of the main body can be made thin. The tall height h of the main body 101 degrades the portability.

(B) In the case of the conventional example shown in FIGS. 10 and 11, the memory cartridge 114 is disposed vertically in the vicinity of the rear wall inside the main body 111 and the battery 113 is disposed vertically in the vicinity of one of the sidewalls inside the main body 111. As a result, the main body 111 grows thicker in depth d though the main body 111 can be reduced in height h. Accordingly, it turns difficult to sense the image at a vertical frame position in view finder, namely to sense the image in portrait angle, by means of holding the lower portion of the camera.

(C) In the case of the conventional example shown in FIGS. 12 and 13, the memory cartridge 124 is displaced horizontally in the lower space inside the main body 121 while the battery 123 is disposed below the memory cartridge 124, the longitudinal edge being aligned in parallel to the depth direction of the main body 121 so that both the height h and the depth d of the battery 123 turns larger. Accordingly, beside the worsening in portability, it turns difficult to sense the images in portrait angle, not in landscape angle, by means of holding the lower portion of the camera.

(D) Furthermore, in the all cases of the three conventional examples mentioned above, both easiness of operation and feeling during usage are quite different from those of the traditional silver salt film camera because the appearance of the main body differs much from that of the silver salt film camera.

SUMMARY OF THE INVENTION

The present invention is carried out to solve the problems mentioned above. An object of the present invention is to provide an electronic camera which can attain an excellent portability as well as can sense images in portrait angle by means of holding a lower portion of the camera and can further obtain drivability and feeling during the usage which are equivalent to those of the silver halide film camera.

(1) A constitution carrying out the object according to the present invention into practice is an electronic camera comprising:

image sensing means for transforming an optical image into electrical image data;

a recording medium for storing aforesaid image data; and a battery for supplying electric power to built-in electronic components, wherein:

aforesaid battery and aforesaid recording medium are disposed in a vertical vicinity of each other near a bottom portion of a main body of aforesaid electronic camera, both width directions of the battery and the recording medium being aligned in a depth direction of the main body of the camera as well as both thickness directions of the battery and the recording medium being aligned in a height direction of the main body of the electronic camera, while the battery is arranged above the recording medium.

As the constitution mentioned above stores the battery and the recording medium in parallel to each other near the bottom portion of the main body of the camera, the main body of the camera is reduced both in height and in depth. Accordingly, a total down-sizing of the camera is available, which not only improves the portability but also enables sensing the images in portrait angle, resulting in improvement of the drivability and of the operational feeling of the camera during sensing the images.

(2) A concrete constitution carrying out the object of the present invention into practice is the electronic camera according to the constitution (1), wherein:

a memory cartridge is employed as aforesaid recording medium.

According to the constitution mentioned above, as the memory cartridge which is liable to be comparatively large in size and has difficulty of reserving a storage space can be stored inside the bottom portion of the main body by aligning the width direction of the memory cartridge in the depth direction of the main body of the camera and by aligning the thickness direction of the memory cartridge in the vertical direction of the main body of the camera, the main body of the camera can be shrinked in depth approximately within the width of the memory cartridge as well as it can be lowered in height. Accordingly, it turns possible to improve the portability, the drivability and the operational feeling during usage of the camera.

(3) Another concrete constitution carrying out the object of the present invention into practice is the electronic camera according to the constitution (1), wherein:

aforesaid main body of the camera has an outside look approximately equal to that of a single lens-type reflex camera which employs a silver halide film as a recording medium; and a reserved space for storing the memory medium has a protruding portion which protrudes in the depth direction of the main body of the camera for forming a finger hooking portion.

According to the constitution mentioned above, as the bottom portion of the main body of the camera turns to be the convex portion having the finger-shaped concavity for hooking fingers, the outside look of the camera turns quite similar to that of the single lens-type reflex camera which protrudes convexities in a back-and-forth direction on the bottom portion when the reflex camera is equipped with either a motor driving mechanism or a motor drive unit. Accordingly, this external shape can assure the equivalent drivability and operational feeling to those of the single lens-type reflex camera.

(4) A still another concrete constitution carrying out the object of the present invention into practice is the electronic camera according to the constitution (1), wherein:

aforesaid battery and/or aforesaid recording medium are rendered capable of being loaded on and unloaded from aforesaid main body of the camera.

According to the constitution mentioned above, as the battery and the memory cartridge turn exchangeable, a continuous usage and a long term usage of the electronic camera are available. It also makes the users capable of applying the electronic camera correspondingly to their utilization statuses.

DETAILED DESCRIPTION OF THE PREFERRED EMBODIMENTS

Hereinafter detailed are the preferred embodiments of the present invention with reference to the drawings of FIGS. 1, 2, 3, 4, 5, 6, 7, 14 and 15. The best modes contemplated by the inventors during carrying out the invention into practice are also described corresponding to the preferred embodiments.

EMBODIMENT 1

Figure 1:
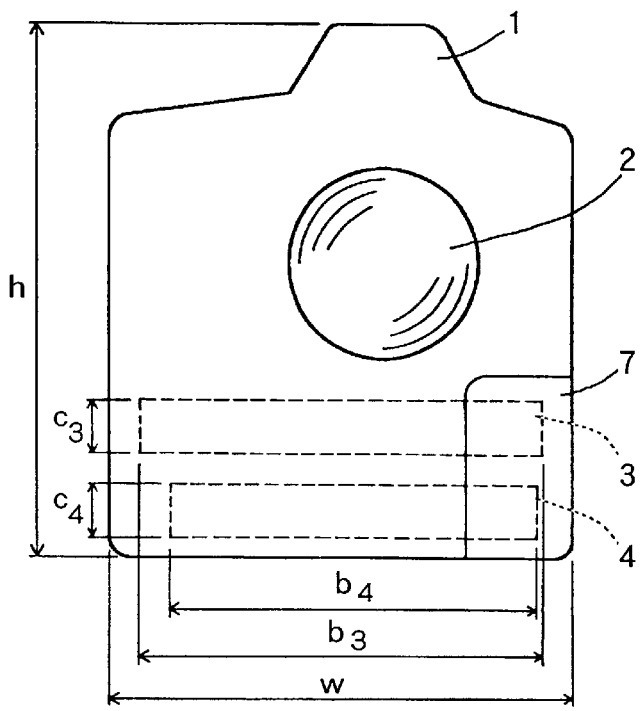
FIG. 1 is a front view showing a schematic constitution of an embodiment of electronic still cameras according to the present invention.
Figure 2:
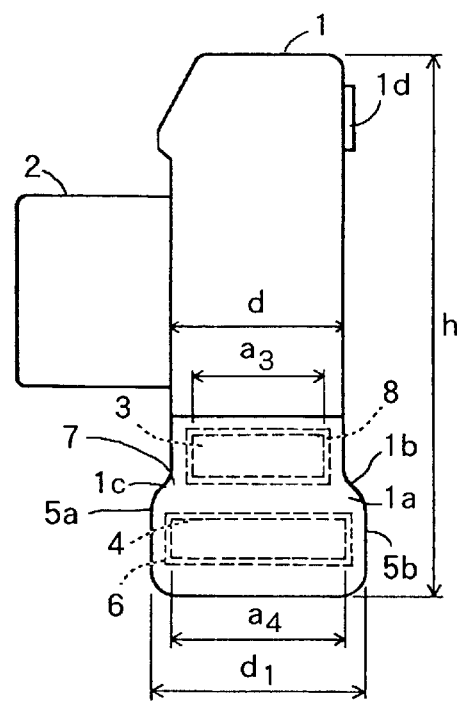
FIG. 2 is a side view of the electronic still camera shown in FIG. 1.

FIGS. 1 and 2 show schematic constitutions of an embodiment in electronic still camera according to the present invention wherein FIG. 1 is a front view and FIG. 2 is a side view.

Figure 5:
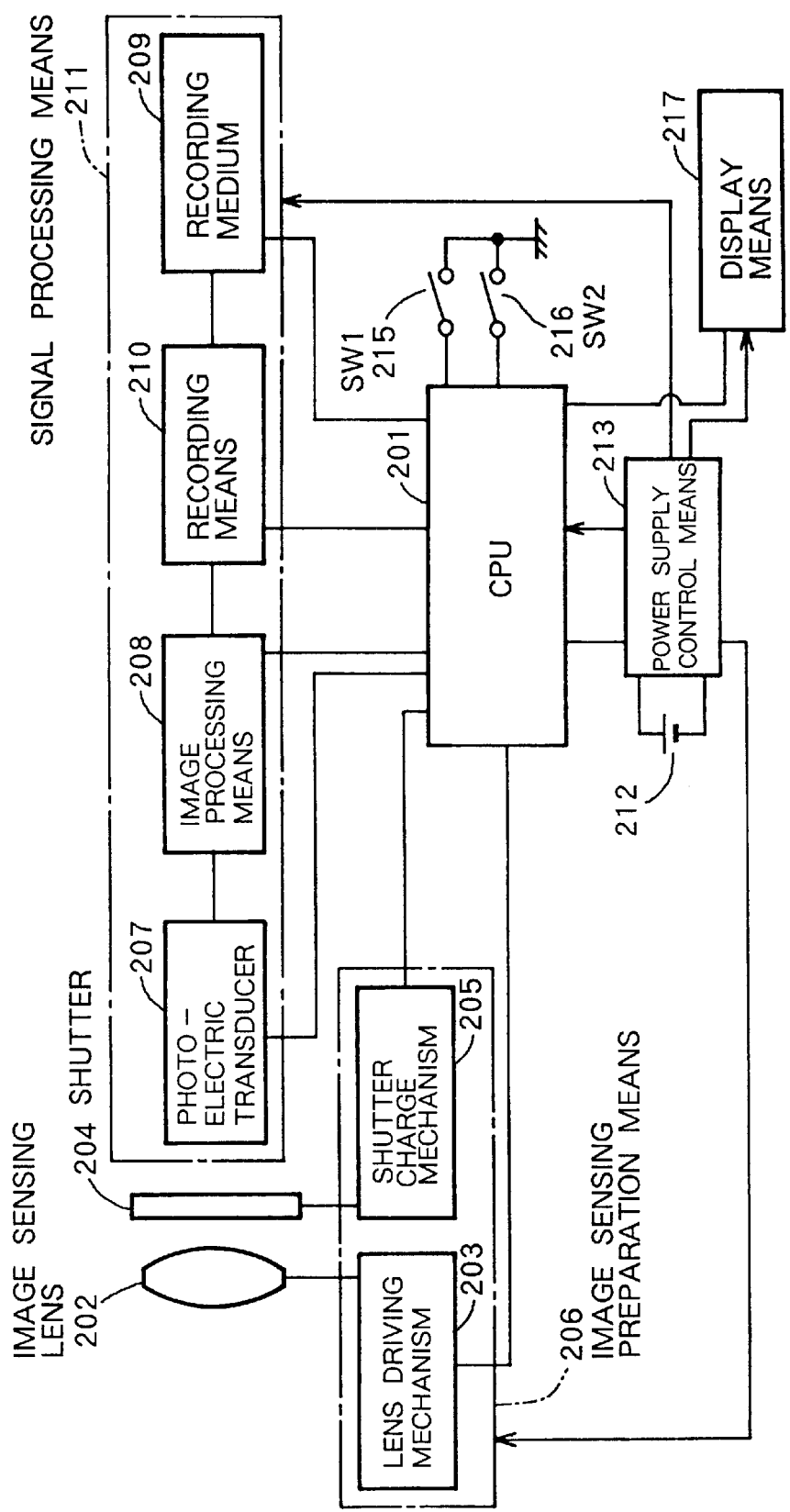
FIG. 5 is a block diagram showing a circuit of the electronic still camera according to the present invention.

In the figures, a numerical sign 1 stands for a main body of the camera, on a rear surface of which an eyepiece window 1d is provided and inside which a circuit shown in a block diagram of FIG. 5 is provided.

A numeric sign 2 stands for an image sensing lens having a certain focal distance which is equipped on a front wall of the main body 1 of the camera while 3 stands for a battery. A numeric sign 4 stands for a memory cartridge and 7 stands for a lid which is provided on the main body 1 of the camera. When the lid 7 is opened, an insertion entrance 6 for inserting the memory cartridge 4 and another insertion entrance 8 for inserting the battery 3 appear on a sidewall of the camera as can be seen from FIG. 2. The battery 3 and the memory cartridge 4 are respectively loaded through the respective insertion entrances 6 and 8 into a storing space 1a reserved on a lower portion of the main body 1 of the camera.

Figure 3:
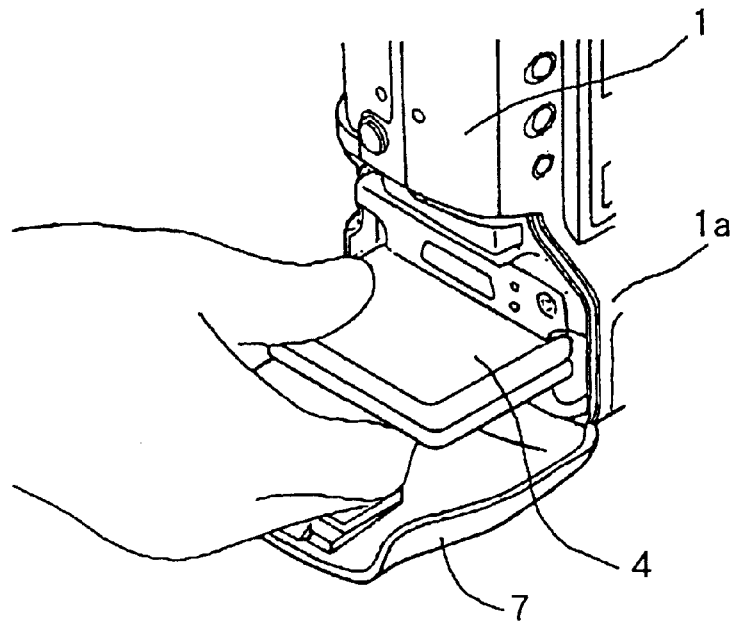
FIG. 3 is a perspective view illustrating procedures for exchanging a memory cartridge of the embodiment shown in FIG. 1.
Figure 4:
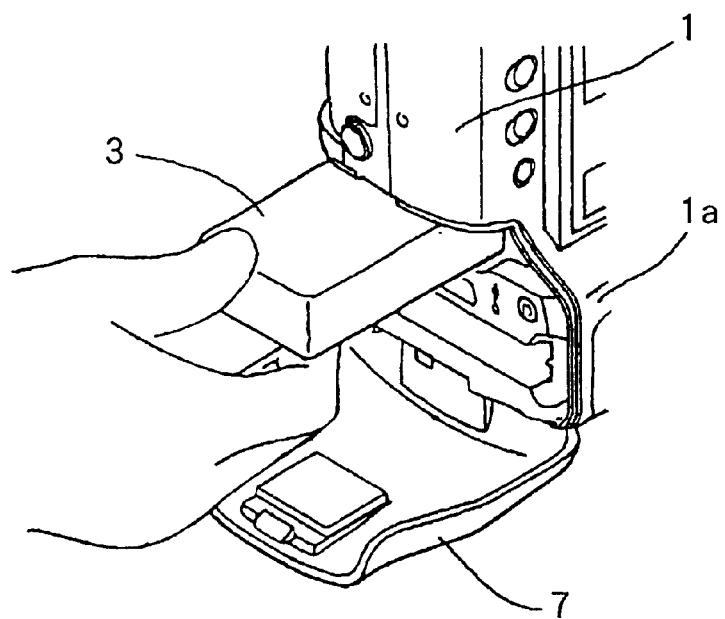
FIG. 4 is a perspective view illustrating procedures for exchanging a battery of the embodiment shown in FIG. 1.

The battery 3 and the memory cartridge 4 are flatly shaped rectangular parallelepipeds, respectively, wherein widths $a_3$ and $a_4$ are smaller than longitudinal lengths $b_3$ and $b_4$ while thicknesses $c_3$ and $c_4$ are smaller than the widths $a_3$ and $a_4$. Further, the width $a_4$ of the memory cartridge 4 is a little bit larger than that $a_3$ of the battery 3. The memory cartridge 4 is exchangeable by loading and unloading through the insertion entrance 6 when the lid 7 is opened. FIG. 3 illustrates the exchanging procedures of the memory cartridge 4. The battery 3 is also exchangeable by loading and unloading through the insertion entrance 8 when the lid 7 is opened. FIG. 4 illustrates the exchanging procedures of the battery 3.

At storing statuses in the main body 1 of the camera, the battery 3 and the memory cartridge 4 are disposed in a vertical vicinity to each other in a lower space of the main body 1 of the camera, the longitudinal sides $b_3$ and $b_4$ being respectively aligned in parallel to the width w direction of the main body 1 of the camera, the width sides $a_3$ and $a_4$ being respectively aligned in parallel to the depth d direction of the main body 1 of the camera and the thickness sides $c_3$ and $c_4$ being respectively aligned in parallel to the height h direction of the main body 1 of the camera. Namely, both the battery 3 and the memory cartridge 4 are stored at a falling down status in the lower space of the main body 1 of the camera, being horizontally disposed in parallel to each other.

Accordingly, the stored statuses of the battery 3 and the memory cartridge 4 in the main body 1 of the camera are lowered in height. Further, as the depth d of the main body 1 of the camera is defined as a size which can just encapsulate the width $a_3$ of the battery 3 and the depth $d_1$ of the lower portion of the main body 1 of the camera is defined as the size which can just encapsulate the width $a_4$ of the memory cartridge 4, the total depths d and $d_1$ of the main body 1 of the camera are reduced.

As can be seen from FIG. 2, the protruding portions 5a and 5b which protrude correspondingly to the width $a_4$ of the memory cartridge 4 are formed respectively on a front surface and on a rear surface of the reserved space 1a for storing the memory cartridge 4. The depth $d_1$ of the protruding portions is larger by ($d_1$–d) than the depth d of the other portion of the main body 1 of the camera.

Shoulder parts of the protruding portions 5a and 5b are used as slopes 1b and 1c for hooking fingers as shown in FIG. 2. As the slopes 1b and 1c act as finger hooking portions for hooking the fingers during sensing the image, they turn the handling operation of the main body 1 of the camera and the sensing operation of the images easier. In particular, the finger hooking portions are effective for sensing the image in portrait angle. The reason why is that the users can take postures for sensing the images in portrait view frame by hooking their finger on the slopes 1b and 1c when they maintain the lower portion of the main body 1 of the camera by hand.

As the battery 3 and the memory cartridge 4 are stored in parallel to each other at the falling-down status on the bottom portion of the main body 1 of the camera as mentioned above, the height h and the depths d and $d_1$ of the main body 1 of the camera are reduced. Accordingly, the electronic still camera of the embodiment according to the present invention can miniaturize the main body 1 of the camera, which results in improvement of portability.

Furthermore, as the electronic still camera of the embodiment according to the present invention reduces the main body 1 of the camera in depth d and in height h as well as has the finger hooking portions on the bottom portion, the outside look turns to be the same as that of the traditional silver salt film camera in size and in shape, which enables to sense the images in portrait angle. Consequently, it can provide the users with the same drivability and the same operational feeling as those of the silver halide film camera.

The FIG. 5 is a block diagram showing a circuit in the embodiment of the electronic still camera according to the present invention. In the figure, 201 stands for a central processing unit (referred to as "CPU") for controlling the whole operations of the electronic still camera, 202 stands for an image sensing lens for sensing the images and 203 stands for a lens driving mechanism for controlling focusing of the images by driving the image sensing lens 202 corresponding to a signal detected by a focus detecting apparatus unshown in the figure. Herein 204 stands for a shutter while 205 stands for a shutter charging mechanism for charging the shutter 204 comprising a motor, a driving mechanism etc., all of which are unshown in the figure. A numeric sign 206 stands for image sensing preparation means which is composed of the lens driving apparatus 203, of the shutter charging mechanism 204 etc.

Herein 207 stands for a photo-electric transducing device for transducing a subject image focused through the image sensing lens 202 into an image signal. On the other hand, 208 stands for image processing means for applying various sorts of processings to an output image signal generated from the photo-electric transducer 207 to transform into image data while 209 stands for a recording medium formed of a magnetic recording apparatus, a semiconductor memory etc. which are either built-in or exchangeable from the camera. A numeric sign 210 stands for recording means for recording the image data on the recording medium 209 and 211 stands for signal processing means formed of the photo-electric transducer 207, the image processing means 208, the recording medium 209 and the recording means 210.

A numeric sign 212 stands for an electric power supply, 213 stands for power supply control means for controlling feeding targets of the power supply 212, 215 stands for a preparation switch SW1 for starting a preparing operation of sensing the images and 216 stands for a release switch SW2 for releasing an image sensing operation. Further, 217 stands for display means formed of a liquid crystal display (referred to as "LED") etc. for converting the image data into the image signals to display the sensed images. The image sensing lens 202, the recording media 210 and the power supply 212 shown in FIG. 5 correspond respectively to the image sensing lens 2, the memory cartridge 4 and the battery 3 shown in FIGS. 1, 2, 3 and 4.

Figure 6:
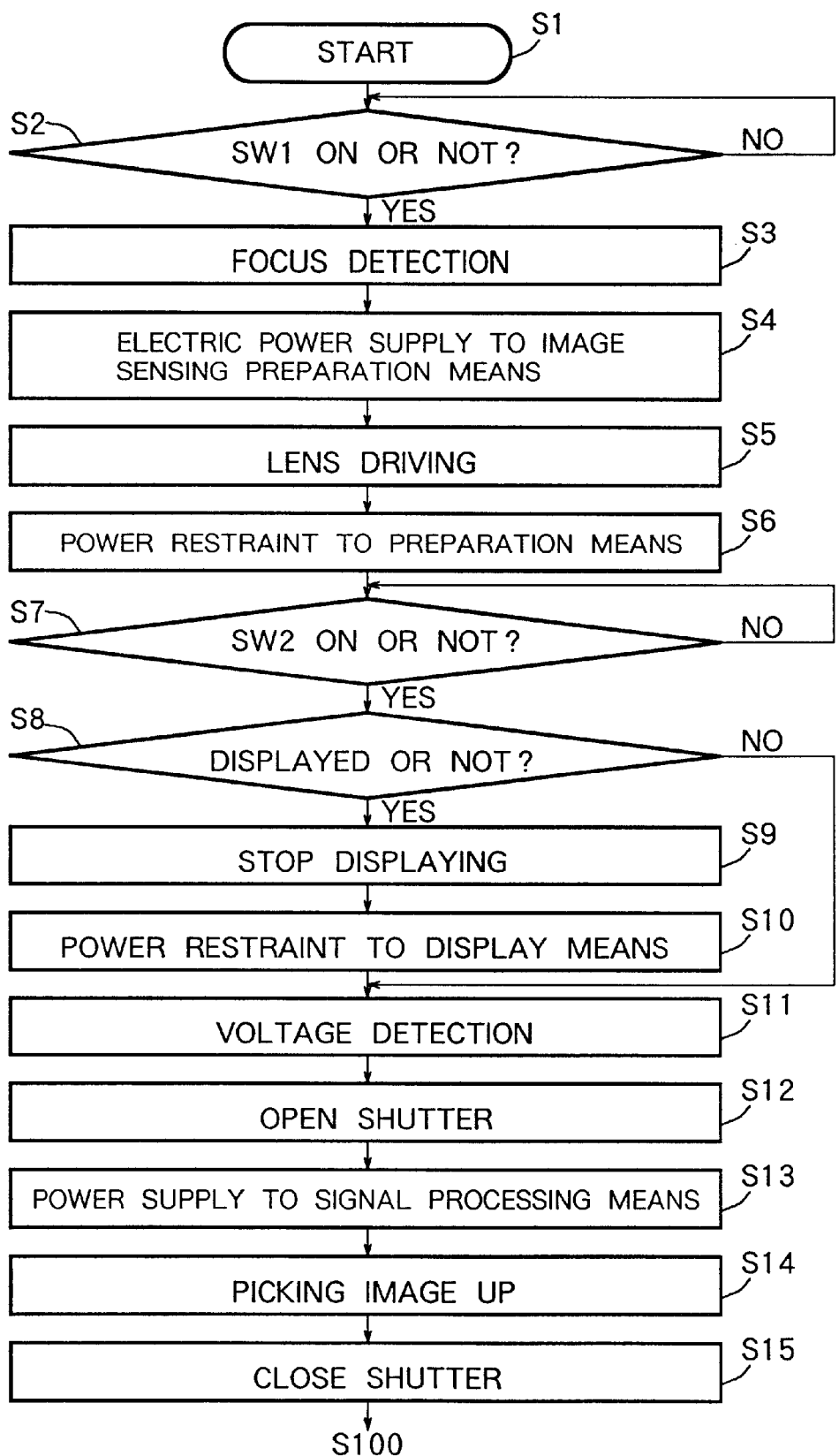
FIGS. 6 and 7 are flow charts for illustrating an operational sequence of the embodiment shown in FIG. 1.
Figure 7:
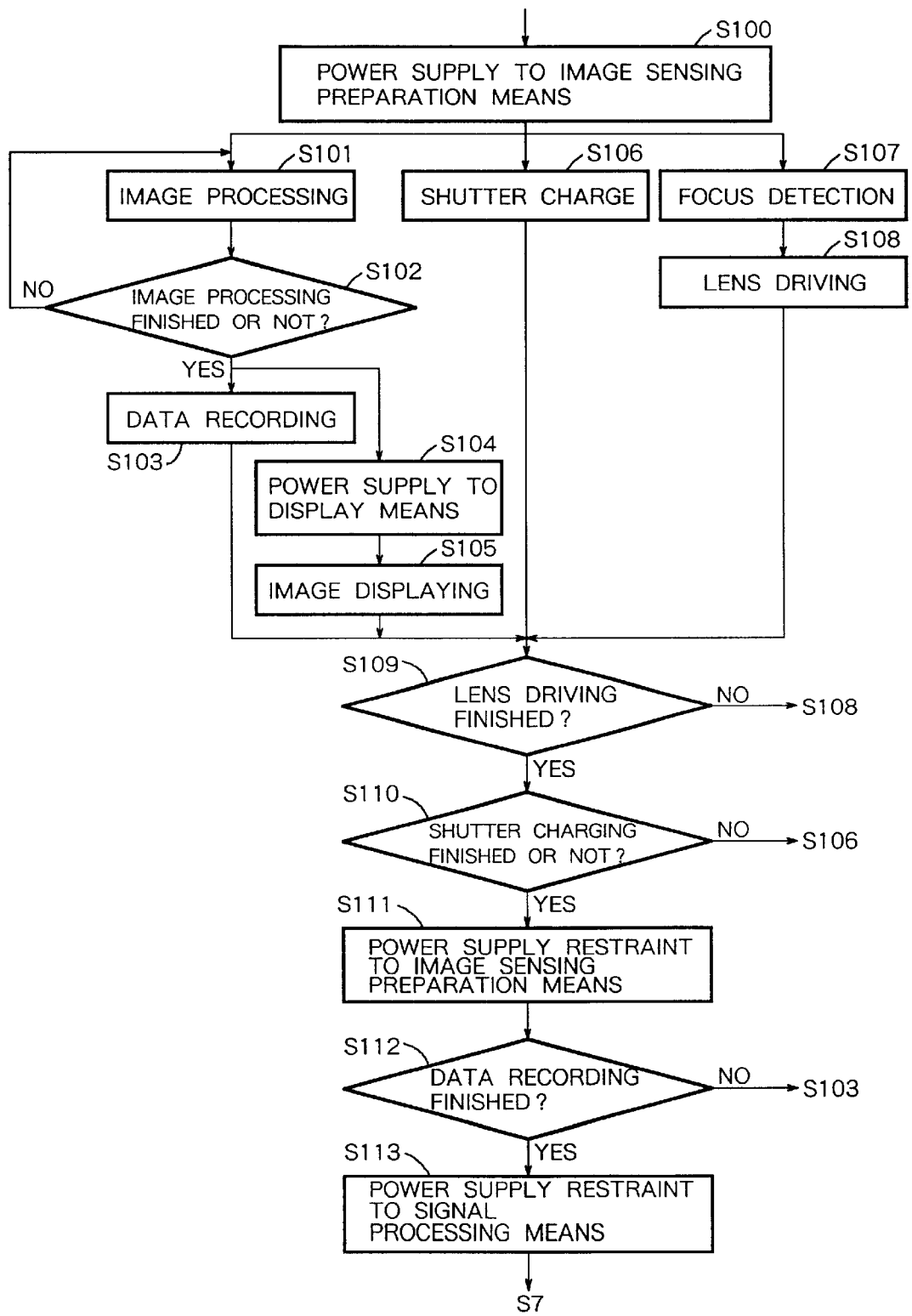
Figure 8:
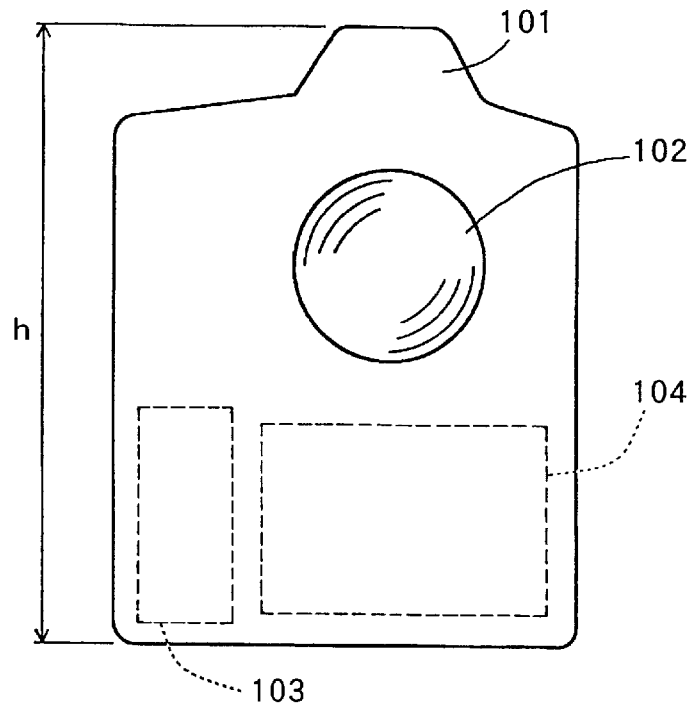
FIG. 8 (PRIOR ART) is a front view showing a schematic constitution of a first example of conventional electronic still cameras.
Figure 9:
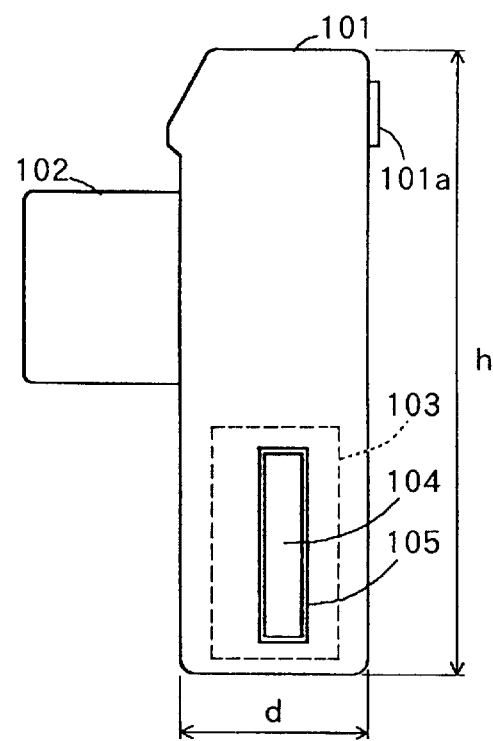
FIG. 9 (PRIOR ART) is a side view of the first example of the conventional electronic still cameras shown in FIG. 8.
Figure 10:
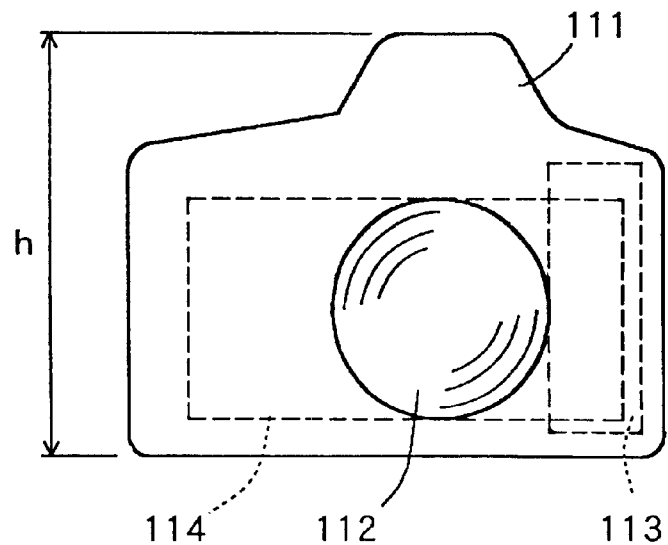
FIG. 10 (PRIOR ART) is a front view showing a schematic constitution of a second example of the conventional electronic still cameras.
Figure 11:
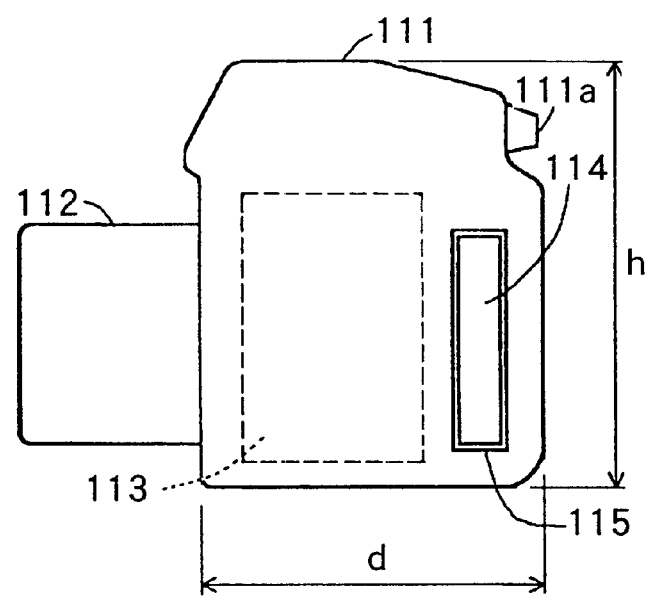
FIG. 11 (PRIOR ART) is a side view of the second example of the conventional electronic still cameras shown in FIG. 10.
Figure 12:
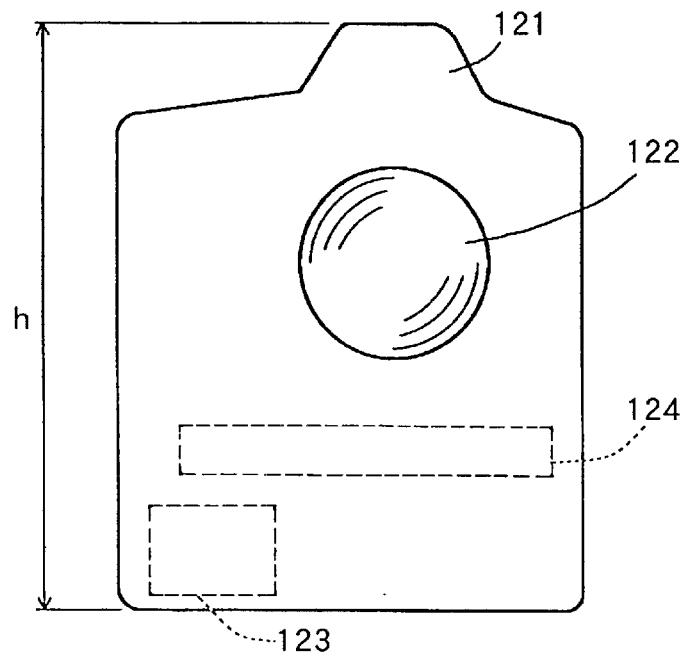
FIG. 12 (PRIOR ART) is a front view showing a schematic constitution of a third example of the conventional electronic still cameras.
Figure 13:
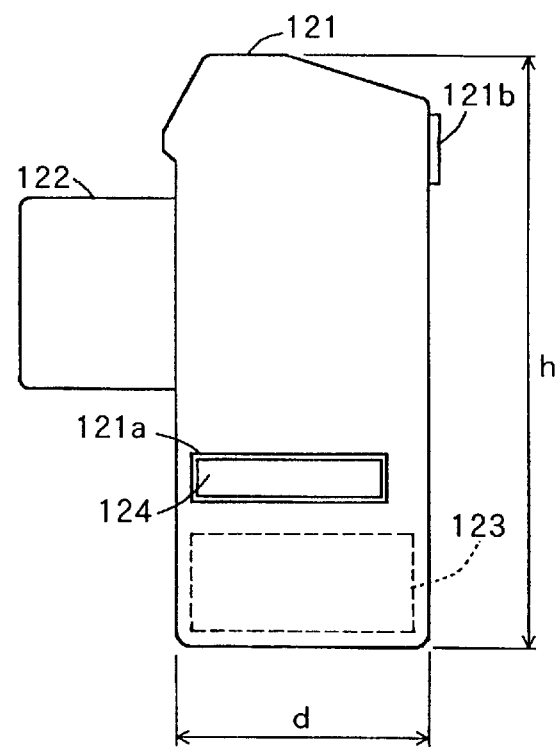
FIG. 13 (PRIOR ART) is a side view of the third example of the conventional electronic still cameras shown in FIG. 12.

FIGS. 6 and 7 are flow charts for illustrating an operational sequence of EMBODIMENT 1 according to the present invention. The operations of EMBODIMENT 1 will be described with reference to those flow charts.

STEP NO. OPERATION

S1: Start the operational sequence.

S2: Judge whether the preparation switch SW1 turns on or off. If it turns on, go to S3. If it turns off, go to S2.

S3: Detect the focal point by use of the focus detecting apparatus which is unshown in the drawings.

S4: The power supply control means 213 supplies the electric power from the power supply 212 to the image sensing preparation means 206.

S5: The lens driving apparatus 203 controls the focusing operation by driving the image sensing lens 202, corresponding to the focus detection results of the focus detecting apparatus unshown in the figures.

S6: The power supply control means 213 restrains the power supply 212 from supplying the electric power to the image sensing preparation means 206.

S7: A determination is made as to whether the release switch SW2 turns on or not. If it turns on, go to S8. If it does not turn on, go to S7.

S8: A judgment is passed on whether the image signal is displayed on the display means 217 as the sensed image or not. If it is displayed, go to S9. If it is undisplayed, go to S11.

S9: Stop displaying the sensed image on the display means 217.

S10: The power supply control means 213 restrains the power supply 212 from supplying the electric power to the display means 217.

S11: A voltage detecting means unshown in the drawings detects a voltage of the power supply 212.

S12: Open the shutter 204.

S13: The power supply control means 213 supplies the electric power from the power supply 212 to the signal processing means 211.

S14: The photo-electric transducer 207 transduces the subject image focused through the image sensing lens 202 into the image signal to pick the image up.

S15: Close the shutter 104.

S100: The power supply control means 213 supplies the electric power from the power supply 212 to the image sensing preparation means 206.

S101: The image processing means 208 performs the image processing for transforming an image signal produced from the photo-electric transducer 207 into the image data by applying various sorts of processings.

S102: A determination is made as to whether the image processing means 208 finished the image processing or not. If it finished, go to S103 and S104. If did not finish, go to 101.

S103: The recording means 210 records the image data on the recording medium 209.

S104: The power supply control means 213 supplies the electric power from the power supply 212 to the image display means 217.

S105: The image display means 217 converts the image data into the image signal to display the sensed image.

S106: The shutter charging mechanism 205 charges the shutter 204.

S107: The focus detecting means unshown in the drawings detects the focusing.

S108: The lens driving apparatus 203 controls the focusing operation by driving the image sensing lens 202, corresponding to the focus detection results of the unshown focus detecting apparatus.

S109: A judgment is passed on whether the lens driving apparatus 203 completed the lens driving operation or not. If it completed, go to S110. If it did not complete, go to S108.

S110: A determination is made as to whether the shutter charging mechanism 205 finished the shutter charging operation or not. If it finished, go to S111. If it did not finish, go to S106.

S111: The power supply control means 213 restrains the power supply 212 from supplying the electric power to the image sensing preparation means 206.

S112: Judge whether the recording means 210 completed the data recording operation or not. If it completed, go to S113. If it did not complete, go to S103.

S113: The power supply control means 213 restrains the power supply 212 from supplying the electric power to the signal processing means 211.

S114: Go to S7.

COMPARATIVE EMBODIMENT

Figure 14:
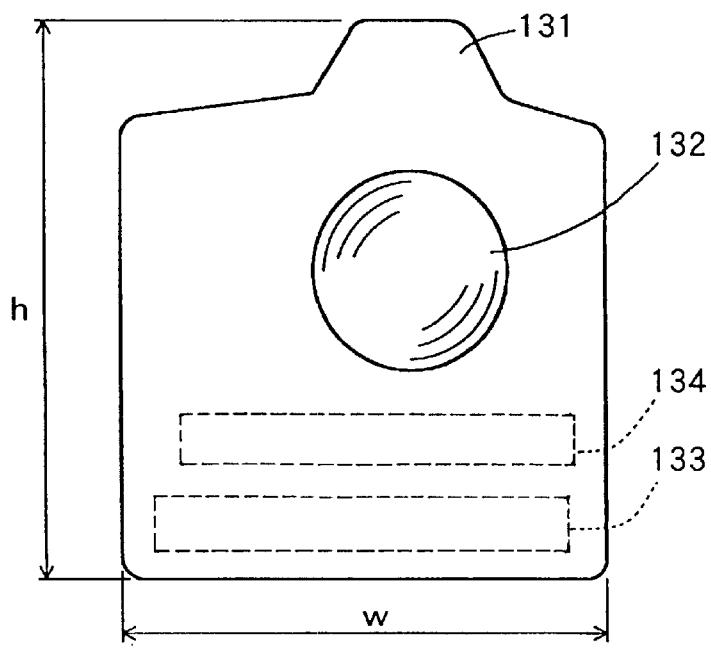
FIG. 14 is a front view illustrating a comparative embodiment which is compared with EMBODIMENT 1 according to the present invention shown in FIG. 1.
Figure 15:
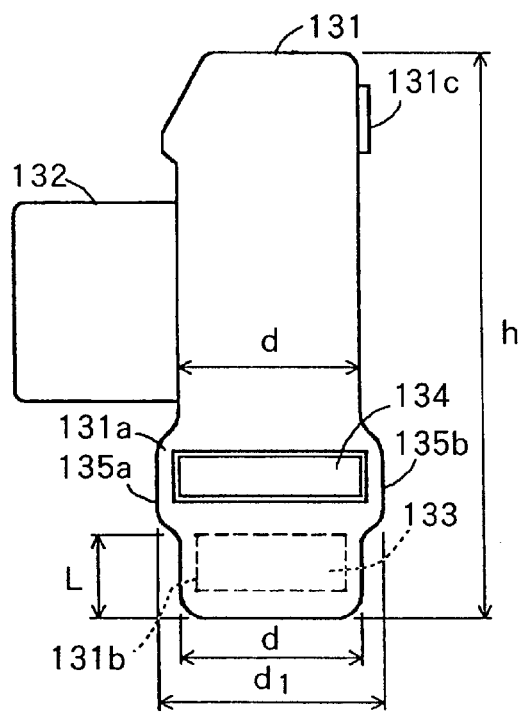
FIG. 15 is a side view showing the comparative embodiment shown in FIG. 14.

FIGS. 14 and 15 show a comparative embodiment which is compared with EMBODIMENT 1 according to the present invention shown in FIGS. 1 and 2. Herein the comparative embodiment indicates another embodiment wherein the reserved spaces for storing the battery 3 and the memory cartridge 4 shown in FIGS. 1 and 2 are substituted to each other.

In FIGS. 14 and 15, 131 stands for the main body of the camera, 131c stands for an eyepiece window of a finder, 132 stands for an image sensing lens, 133 stands for a battery and 134 stands for a memory cartridge. As the constitution mentioned above stores the memory cartridge 134 and the battery 133 in a vertical adjacency to each other on the bottom portion of the main body 131 of the camera, the main body 131 of the camera is lowered in height h and thinned in depth d as the same as the electronic still camera according to EMBODIMENT 1. Accordingly, the electronic still camera can be improved in miniaturization as well as in portability.

However, the protruding portions 135a and 135b of the reserved space 131a for storing the memory cartridge 134 is formed on an upper portion which is higher by L in height than a lowermost end of the main body 131 of the camera while the reserved space 131b for storing the battery 133 which is thinner than the protruding portions 135a and 135b is formed in a region lower than L in height. Consequently, if sensing the images is performed at a vertical position in image frame, the users have to grip the lower portion referred to "L" of the camera, which turns the drivability extremely worse.

The reason why the battery 3 is stored being overlying the memory cartridge 4 and the memory cartridge 4 is stored being underlying the battery 3 in the constitution according to the present invention is due to the situations mentioned above.

In EMBODIMENT 1 and COMPARATIVE EMBODIMENT mentioned above, the image sensing lens 2 and 132 belong to the image sensing means while the memory cartridges 4 and 134 correspond to the memory media, both of which were described previously in (1) of the summary of the invention.

Although the constitutions and the operations according to the present invention are described in the status of the electronic still camera as the preferred embodiments, the effectiveness and the applications of the invention are not restricted to the electronic still camera but they are expandable to other technical fields such as the camcoder's, the electronic moving picture camera's etc.

As the constitution of (1) according to the present invention stores the battery and the recording media being disposed at a vertical vicinity to each other near the bottom space of the main body of the camera at the falling-down status in parallel to each other as mentioned above, the main body of the camera can be reduced in height and in depth, which results not only in miniaturization of the electronic camera but also in improvement of portability, of drivability and of operational feeling of the camera during sensing the image.

As another constitution of (2) according to the present invention employs the memory cartridge as the recording medium, it turns capable to shrink the main body of the camera in depth approximately within the width of the memory cartridge, which results also in enabling a downsizing of the camera in height and in depth.

As the still another constitution of (3) according to the present invention has the outside look which is almost equal to that of the single lens-type reflex camera employing the silver halide film wherein the reserved space for storing the memory cartridge has the protruded portion for hooking the fingers that protrudes in the depth direction of the main body of the camera, both the drivability and the feeling during operation which are equivalent to those of the single lens-type reflex camera can be attained.

As the further still another constitution of (4) according to the present invention makes it capable to load and to unload the battery as well as the recording medium onto and out of the main body of the camera, the continuous usage and the long term utilization of the electronic camera turn available as well as the application of the camera corresponding to the application modes of the users can be obtained.

What is claimed is:

1. An electronic camera comprising:
    an image sensor for transforming an optical image into electrical image data;
    a recording medium area for disposing a recording medium; and
    a battery area for disposing a battery, wherein:
        said recording medium area and said battery area are disposed under an image sensing optical pass in a vertical arrangement to each other, both width directions of said recording medium area and said battery area being aligned in a depth direction of a main body of said electronic camera and both thickness directions being aligned in a height direction of said main body of said camera, while said battery area is arranged above said recording medium area.

2. The electronic camera according to claim 1, wherein:
    said recording medium is formed of a memory cartridge.

3. An electronic camera according to claim 1, wherein:
    said recording medium has a protruding portion which protrudes in said depth direction of said main body of said camera for holding said camera.

4. The electronic camera according to one of claims 1 and 3, wherein:
    said battery and/or said recording medium can be loaded on and unloaded out of said main body of said camera.

5. A camera comprising:
    a recording medium area for disposing a recording medium; and
    a battery area for disposing a battery, wherein:
        said recording medium area and said battery area are disposed under an image sensing optical pass in a vertical arrangement to each other, both width directions of said recording medium area and said battery area being aligned in a depth direction of a main body of said camera and both thickness directions being aligned in a height direction of said main body of said camera, while said battery area is arranged above said recording medium area.

* * * * *

UNITED STATES PATENT AND TRADEMARK OFFICE
CERTIFICATE OF CORRECTION

PATENT NO.     : 6,590,614 B1
DATED          : July 8, 2003
INVENTOR(S)    : Tetsuya Nishio et al.

It is certified that error appears in the above-identified patent and that said Letters Patent is hereby corrected as shown below:

<u>Title page,</u>
After Item [22], insert Item [30] as follows:
-- [30]  Foreign Application Priority Data
    Jan. 30, 1998  (JP) ….…………. 10-032396
    Nov. 25, 1998  (JP) ……………... 10-334167 --.

Signed and Sealed this

Twenty-third Day of December, 2003

JAMES E. ROGAN
*Director of the United States Patent and Trademark Office*